(12) United States Patent
Kishima

(10) Patent No.: US 7,697,804 B2
(45) Date of Patent: Apr. 13, 2010

(54) METHOD FOR GENERATING A HIGH-FREQUENCY SIGNAL AND APPARATUS FOR GENERATING A HIGH-FREQUENCY SIGNAL

(75) Inventor: Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/216,734

(22) Filed: Jul. 10, 2008

(65) Prior Publication Data
US 2009/0022447 A1 Jan. 22, 2009

(30) Foreign Application Priority Data
Jul. 20, 2007 (JP) ............... 2007-188964

(51) Int. Cl.
*G02B 6/26* (2006.01)
(52) U.S. Cl. ........................................ 385/27
(58) Field of Classification Search ............ None
See application file for complete search history.

(56) References Cited

U.S. PATENT DOCUMENTS

| | | | |
|---|---|---|---|
| 4,720,160 A * | 1/1988 | Hicks, Jr. ............... | 385/31 |
| 6,522,799 B1 | 2/2003 | Bazylenko et al. | |
| 6,892,015 B2 * | 5/2005 | Tadakuma et al. ........ | 385/122 |
| 7,076,120 B2 * | 7/2006 | Leuthold et al. ......... | 385/3 |
| 2003/0156778 A1 | 8/2003 | Laval et al. | |

FOREIGN PATENT DOCUMENTS

| | | | |
|---|---|---|---|
| JP | 62-100706 A | 5/1987 | |
| JP | 11-298072 A | 10/1999 | |
| JP | 2000-284192 A | 10/2000 | |
| JP | 2002-014242 A | 1/2002 | |
| JP | 2002-540451 | 11/2002 | |
| JP | 2006-279882 A | 10/2006 | |
| JP | 2007-149789 A | 6/2007 | |
| JP | 2004-505310 | 2/2009 | |

OTHER PUBLICATIONS

Yi-Jen Chiu et al., Enhanced Performance in Traveling-Wave Electroabsorption Modulators Based on Undercut-Etching the Active-Region, IEEE Photonics Technology Letters, vol. 17, No. 10, Oct. 2005.
Prakash Koonath, et al., Vertically-Coupled Micro-Resonators Realized Using Three-Dimensional Sculpting in Silicon, Applied Physics Letters, vol. 85, No. 6, Aug. 9, 2004.
Koonath, Prakask, Sculpting of Three-Dimensional Nano-Optical Structures in Silicon, Applied Physics Letters, vol. 83, No. 24, Dec. 15, 2003.

* cited by examiner

*Primary Examiner*—Sung H Pak
(74) *Attorney, Agent, or Firm*—Rader, Fishman & Grauer PLLC

(57) ABSTRACT

A method for generating a high-frequency signal includes the steps of entering an optical pulse to a wavelength filtering device and generating modulating light having periodic wavelength intervals, and inputting the optical pulse outputted from the wavelength filtering device to a wavelength dispersive device to subject the optical pulse to treatment of different speeds according to the wavelength, and separating the optical pulse into time pulses independent with respect to the wavelength.

5 Claims, 10 Drawing Sheets

FIG.1C1
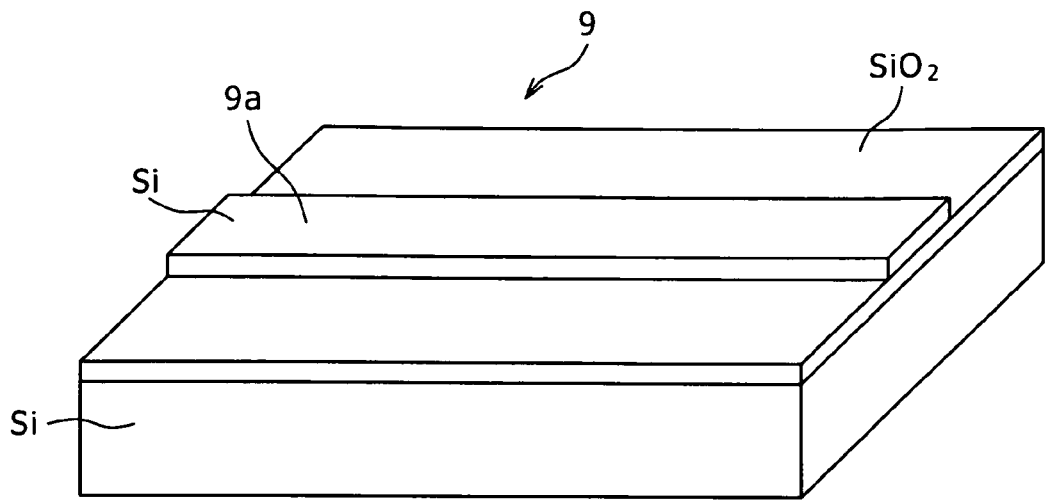
FIG.1C2
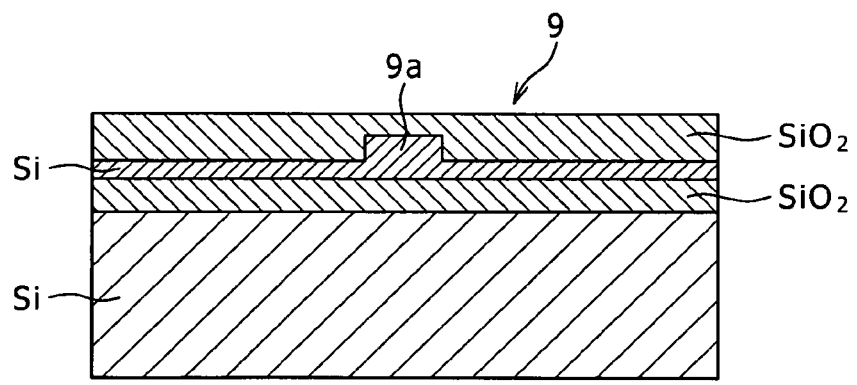
FIG.1C3
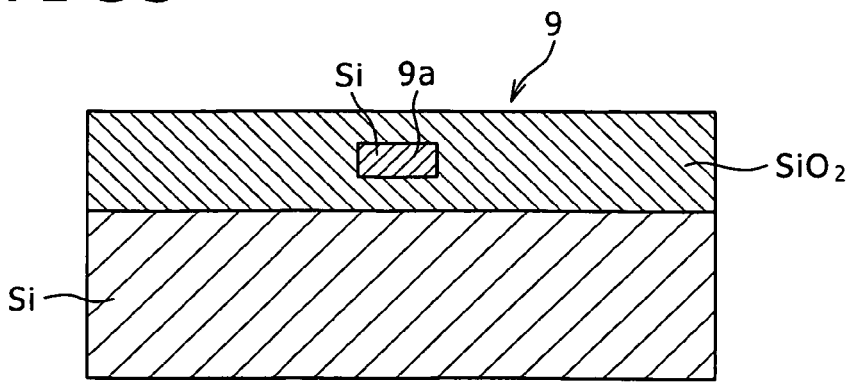

INCIDENT LIGHT
OPTICAL PULSE HAVING BROAD WAVELENGTH INTERVAL

OUTPUT OF PULSED LASER SOURCE AND WAVELENGTH FILTERING DEVICE

OUTPUT OF WAVELENGTH DISPERSIVE DEVICE

OUTPUT OF WAVELENGTH FILTERING DEVICE

OUTPUT OF WAVELENGTH DISPERSIVE DEVICE

FIG.5A OUTPUT OF PULSE FORMING DEVICE
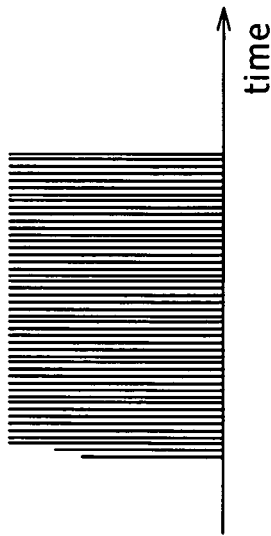
FIG.5B OUTPUT OF PULSE FORMING DEVICE
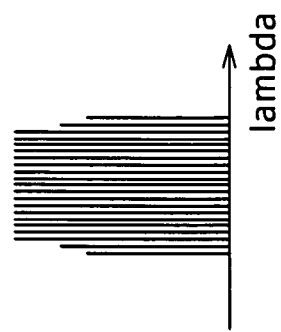
FIG.5C OUTPUT OF WAVELENGTH DISPERSIVE DEVICE
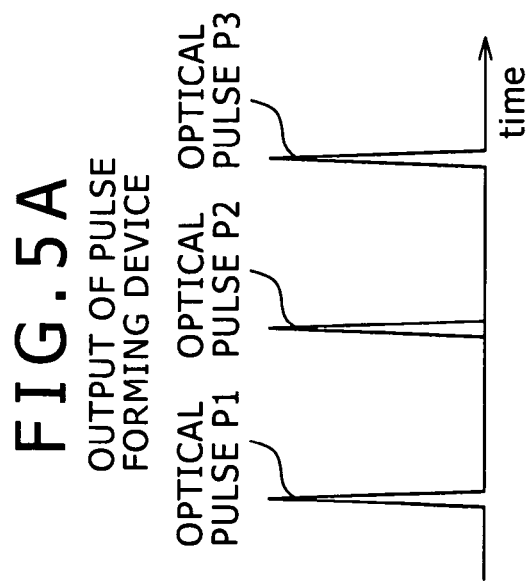
FIG.5D OUTPUT OF WAVELENGTH DISPERSIVE DEVICE
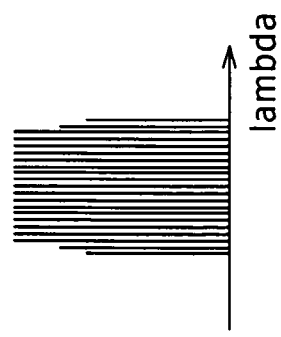

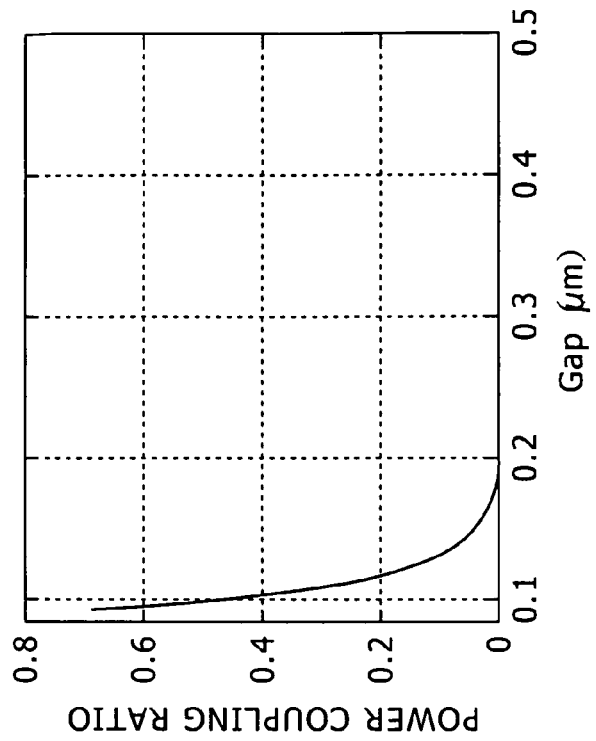
FIG.7B
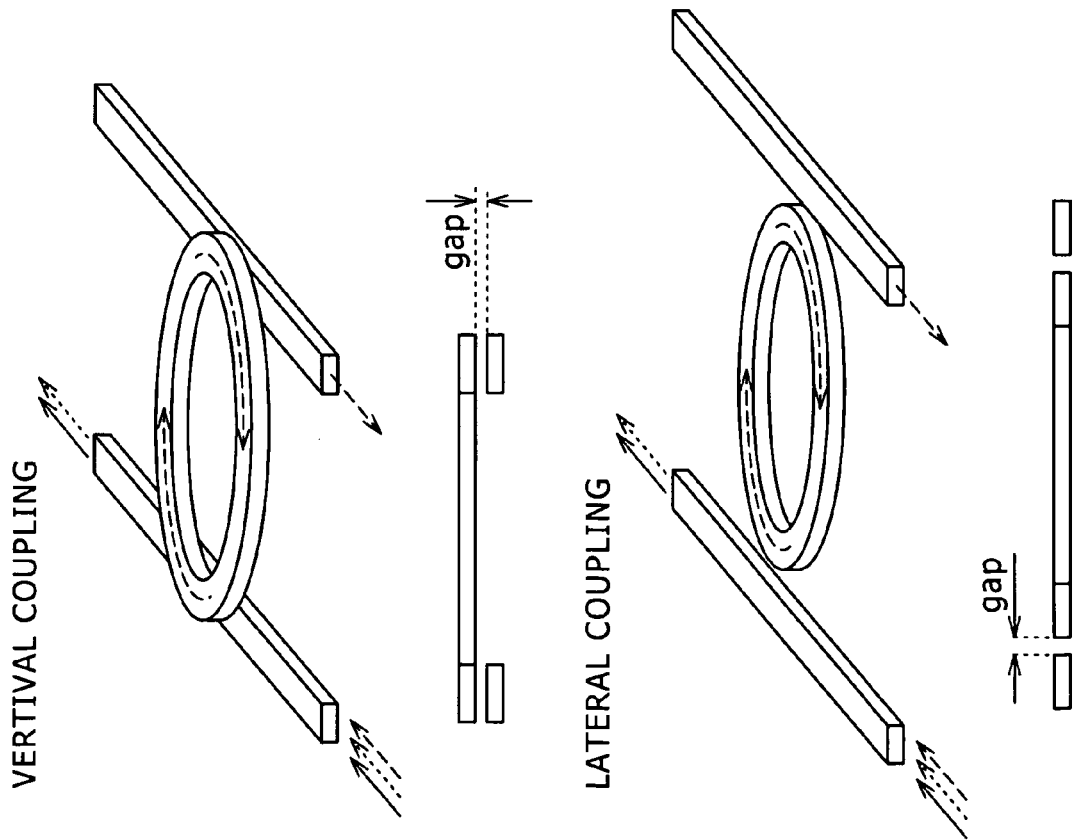

US 7,697,804 B2

METHOD FOR GENERATING A HIGH-FREQUENCY SIGNAL AND APPARATUS FOR GENERATING A HIGH-FREQUENCY SIGNAL

BACKGROUND OF THE INVENTION

Field of the Invention

The present invention relates to a method for generating a high-frequency signal and an apparatus for generating a high-frequency signal.

In a light source, such as 40 GbE {Gigabit Ethernet (registered trademark)}, a pulse train waveform is formed by inputting a periodic electrical signal using a traveling wave into an absorption-type modulator (see, for example, Yi-Jen Chiu, Tsu-Hsiu Wu, Wen-Chin Cheng, F. J. Lin, and John E. Bowers, "Enhanced Performance in Traveling-Wave Electroabsorption Modulators Based on Undercut-Etching the Active-Region", IEEE PHOTONICS TECHNOLOGY LETTERS, VOL. 17, NO. 10, OCTOBER 2005, p. 2,065-2,067, Non-Patent Document 1).

However, it is the that the mechanism in which a high-frequency pulse train is formed by electrical modulation will have limitations.

In view of the above issues, it is desirable to provide a new scheme for forming a high-frequency pulse train in embodiments of the present invention.

SUMMARY OF THE INVENTION

In the method for generating a high-frequency signal or apparatus for generating a high-frequency signal according to an embodiment of the present invention, an optical pulse having a relatively wide wavelength is emitted from a light source and allowed to be entered a wavelength filtering device to generate modulating light having periodic wavelength intervals. The resultant optical pulse is inputted into a wavelength dispersive device and subjected to treatment having different speeds according to the wavelength, so that the optical pulse is separated into time pulses independent with respect to the wavelength.

An optical pulse having a wide wavelength is caused to enter a wavelength filtering device having a predetermined modulation degree, and the resultant output is caused to enter a wavelength dispersive device, thus generating a high-frequency pulse train (high speed optical pulse train).

The wavelength filtering device preferably has a configuration including a first optical waveguide having no wavelength selectivity through which the incident light travels straight, and a microring resonator having a second optical waveguide disposed at a position for resonance coupling with the first optical waveguide, as a principal portion.

Each of the first and second optical waveguides in the wavelength filtering device is preferably formed by a SOI (silicon on insulator) technology. Particularly, rather than an in-plane coupling type having a construction in which the first optical waveguide through which the incident light travels straight and the second optical waveguide constituting the microring resonator are disposed in the plane direction of a substrate in parallel, a vertical coupling type, formed by a SIMOX (separation by implanted oxygen) technology, having a configuration in which silicon and silicon oxide are stacked in the thickness direction of a substrate is preferred.

BRIEF DESCRIPTION OF THE DRAWINGS

FIG. 1C is view showing examples of the construction of a wavelength dispersive device used in the apparatus for generating a high-frequency signal;

FIGS. 4A to 4F are diagrams for explaining the first example of a process for generating a high-frequency pulse signal by means of the apparatus for generating a high-frequency signal;

FIGS. 5A to 5D are diagrams for explaining the second example of a process for generating a high-frequency pulse signal by means of the apparatus for generating a high-frequency signal;

FIG. 7B are views and a graph for explaining the difference between the each wavelength filtering devices in the apparatuses for generating a high-frequency signal according to the first and third embodiments.

DETAILED DESCRIPTION OF THE EMBODIMENT

The embodiments of the present invention will be described in detail with reference to the accompanying drawings.

First Embodiment

Figure 1:
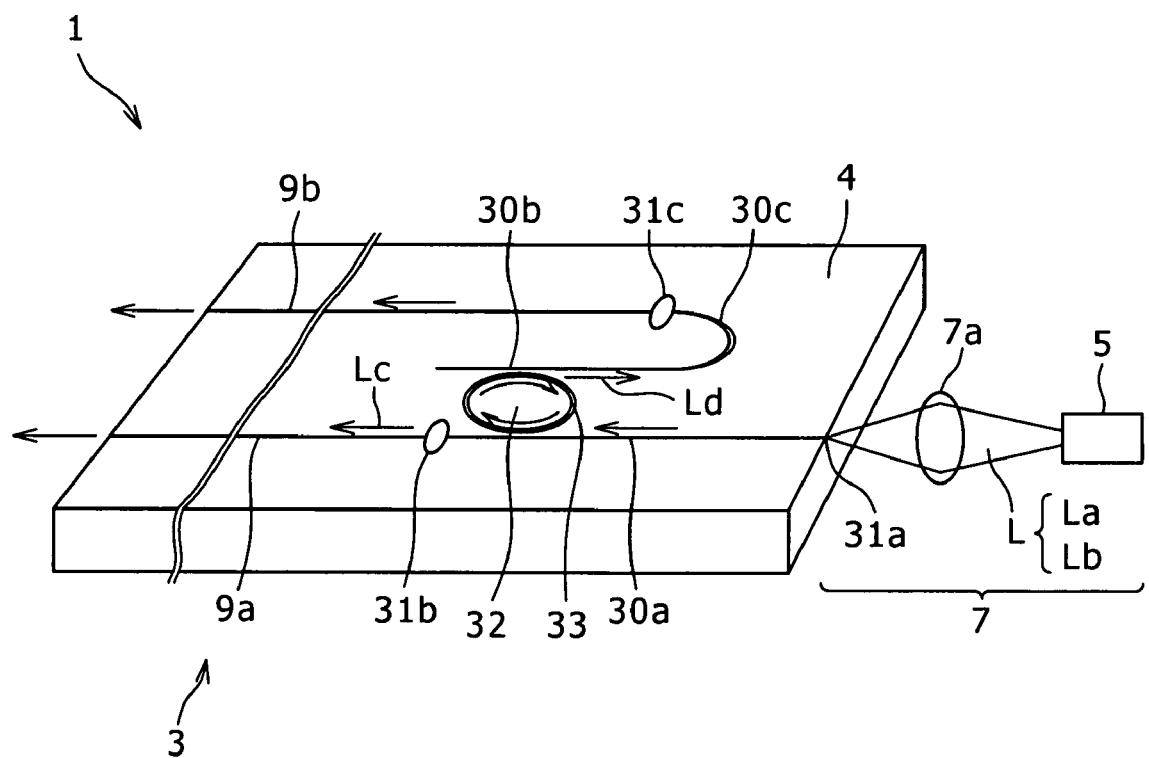
FIG. 1 is a perspective view showing the whole structure of an apparatus for generating a high-frequency signal according to the first embodiment of the present invention.
Figure 1A:
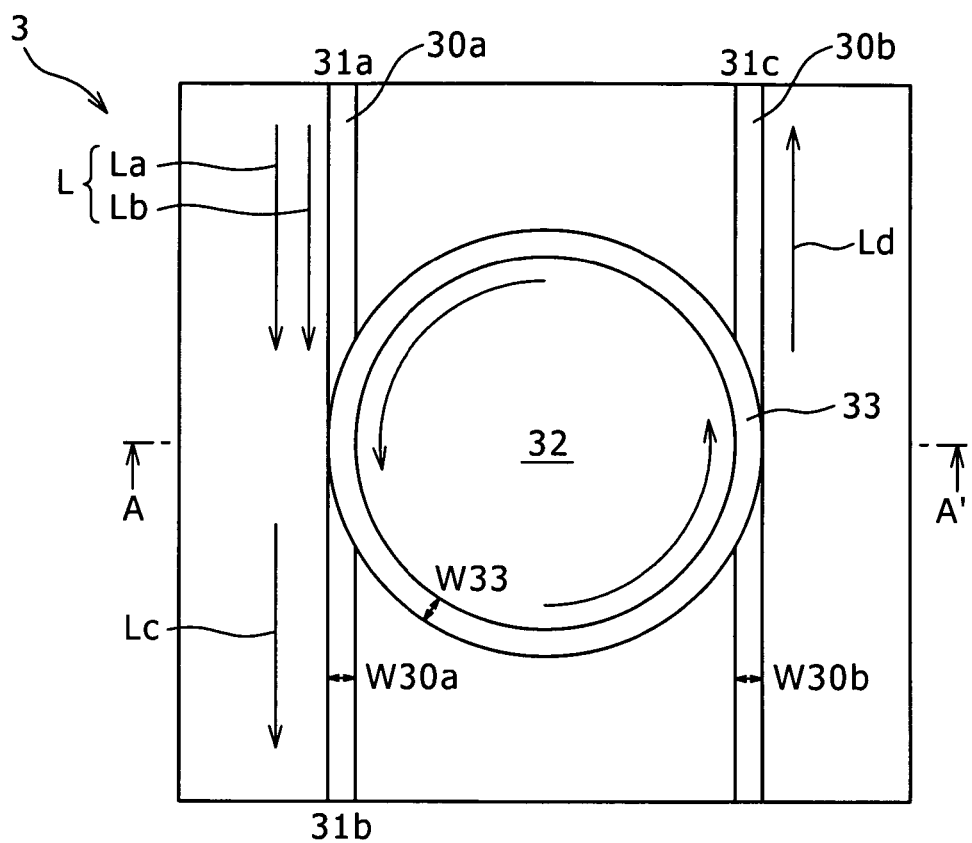
FIG. 1A is a plan view of a wavelength filtering device in the apparatus for generating a high-frequency signal according to the first embodiment.
Figure 1B:
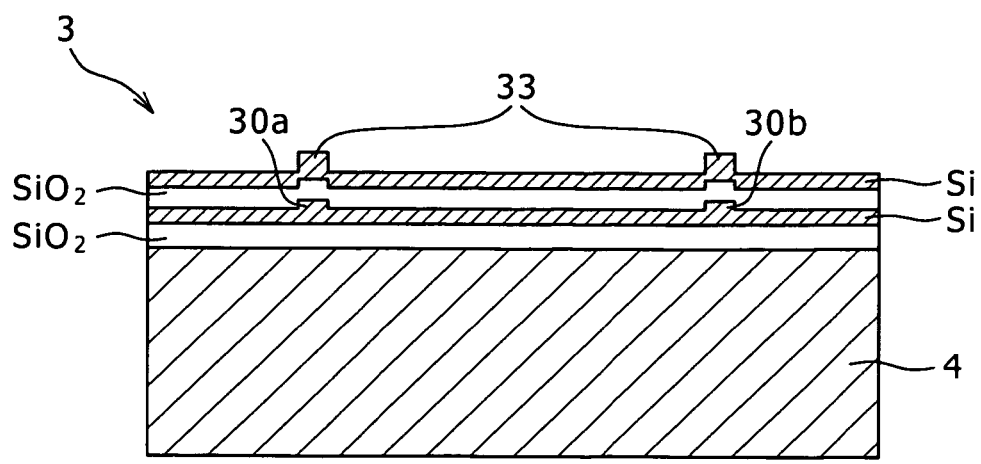
FIG. 1B is a cross-sectional view of the wavelength filtering device of FIG. 1A (taken along the line A-A' of FIG. 1A)

FIGS. 1 and 1A to 1C are views for explaining an apparatus for generating a high-frequency signal according to the first embodiment of the present invention. FIG. 1 is a perspective view showing the whole structure of an apparatus 1 for generating a high-frequency signal (hereinafter, referred to as "high-frequency signal generating apparatus 11") according to the first embodiment. FIG. 1A is a plan view of a wavelength filtering device 3 in the high-frequency signal generating apparatus 1 according to the first embodiment. FIG. 1B is a cross-sectional view of the wavelength filtering device 3 of FIG. 1A (taken along the line A-A' of FIG. 1A). FIG. 1C is view showing examples of the construction of a wavelength dispersive device used in the high-frequency signal generating apparatus 1.

In the high-frequency signal generating apparatus 1 according to the present embodiment, an optical waveguide device utilizing a SIMOX technology or the like is applied to a technique for generating a high-frequency signal. By adding an optical waveguide device, which is a passive optical components, to a pulse generated by using an existing electrical method or the like, the frequency of pulse is increased by several to several tens times. By combining a wavelength filtering device having a large modulation degree formed by a method for forming a SIMOX optical waveguide or the like with an optical waveguide (e.g., wavelength dispersive device), a pulse train signal having intervals of about several tens fs (femtoseconds) or less, which is not easy to be formed by electrical modulation, such as increasing the frequency of an optical signal, is generated without electric load.

SIMOX is an example of SOI (silicon on insulator) technology, namely, a SOI forming technique using oxygen ion implantation. SOI is a semiconductor having single crystal silicon as a substrate formed on an insulating film and a semiconductor technique. In the SOI technique, cryptorchid of charges flowing from a transistor layer on the processor substrate through the insulating layer can be reduced by half or so, and therefore there are advantages in that the performance can be improved several tens % at most or the power consumption can be reduced by half or so, as compared to those of, e.g., a similar chip operating at the same clock speed. However, while the silicon crystal thin film for forming a transistor is pure silicon crystal, the underlying insulating film is not a complete crystal, and therefore there is a problem in that it is difficult to form a complete crystal on the insulating film.

One method for solving the issue is a SIMOX technique, which is a technique for forming a substrate formed of layers of silicon and silicon oxide. Specifically, oxygen molecules are implanted by ion implantation into a semiconductor substrate at a portion slightly below the silicon crystal surface, and then the resultant substrate is subjected to heat treatment to oxidize the implanted oxygen molecules at a high temperature, whereby an oxide (insulator) layer is formed and an oxide insulating layer and a silicon crystal thin film on the insulating layer are formed. The heat treatment also repairs defects of the crystal structure caused due to the passing ions.

The present inventor has found a method for forming an optical waveguide immediately below the surface of the silicon substrate by use of a method to which SIMOX method being one of the methods for producing a SOI substrate is applied, and has developed a microring resonator optical waveguide device having a high power coupling ratio (hereinafter, frequently referred to as "SIMOX optical waveguide device") by laminating a microring resonator and an optical waveguide having no wavelength selectivity in the thickness direction of a substrate (see Prakash Koonath, Tejaswi Indukuri, and Bahrain Jalalib, "Vertically-coupled microresonators realized using three-dimensional sculpting in silicon", APPLIED PHYSICS LETTERS VOLUME 85, NUMBER 69 AUGUST 2004, Department of Electrical Engineering, University of California-Los Angeles, Los Angeles, Calif. 90095-1594, Reference document 1).

By applying the SIMOX optical waveguide device to the generation of a high-frequency signal, a scheme of solving issues in generating a high-frequency signal which is not easy to generate by related art electrical modulation is developed. A basic mechanism of the scheme is that a laser light having a wide wavelength is caused to enter a wavelength filtering device 3 (wavelength filtering device) having a large modulation factor formed by a SIMOX optical waveguide forming method or the like, and then caused to enter an optical waveguide (e.g., wavelength dispersive device) and travel through it, thereby generating a modulating signal having intensity which changes in respect of time.

The optical waveguide having no wavelength selectivity has a structure in which a silicon optical waveguide formable by a SIMOX optical waveguide forming method or the like is used, and can be produced by combining a micro-patterning technique easily applied to the silicon substrate. With respect to the microring resonator, a SIMOX forming method may be preferably used.

In forming the optical waveguide or microring resonator, use is not necessarily limited to the SIMOX technique, but other typical SOI techniques using a silicon material as a base may be used. By utilizing a SOI technique, a very fine pattern may be formed by using a current VLSI (large scale integrated circuit) fabrication technique. Further, the material for substrate is not glass but silicon, and therefore a disadvantage of poor mass-productivity caused like the case of the glass substrate may be avoided. A mechanism for generating a high-frequency signal by combining the wavelength filtering device 3 utilizing a SIMOX technique with an optical waveguide (e.g., wavelength dispersive device) will be described in detail.

As shown in FIG. 1, the high-frequency signal generating apparatus 1 according to the first embodiment includes a wavelength filtering device 3, a light source 5, an optical system 7 for introducing light from the light source 5 to the wavelength filtering device 3, and a wavelength dispersive device 9 which is an example of an optical waveguide for guiding the light outputted from the wavelength filtering device 3.

As shown in FIGS. 1 and 1A, the wavelength filtering device 3 has, on a silicon substrate 4, two linear optical waveguides 30 (designated by 30$a$, 30$b$) having no wavelength selectivity and a microring resonator 32 having a ring optical waveguide 33 as a second optical waveguide. With respect to the optical waveguides 30, one side is referred to as "incidence-side optical waveguide 30$a$" particularly as a first optical waveguide, and the other side is referred to as "separation-side optical waveguide 30$b$" particularly as a third optical waveguide. The incidence-side optical waveguide 30$a$, separation-side optical waveguide 30$b$, and optical waveguide 33 have respective widths W30$a$, W30$b$, W33 of, e.g., about 2 μm. The microring resonator 32 has a size (diameter φ32) of, e.g., about 100 to 200 μm.

A combination of the microring resonator 32 (optical waveguide 33) and the incidence-side optical waveguide 30$a$ having no wavelength selectivity and a combination of the microring resonator 32 (optical waveguide 33) and the separation-side optical waveguide 30$b$ having no wavelength selectivity individually constitute wavelength filters.

Incident light L entering an incident edge face 31$a$ of the incidence-side optical waveguide 30$a$ includes light having a wavelength which is not equal to the resonance frequency (hereinafter, referred to as "non-resonance light") La and light having a wavelength equal to the resonance frequency (hereinafter, referred to as "resonance light") Lb.

The high-frequency signal generating apparatus 1 according to the first embodiment has a structure in which a modulating signal can be obtained at two output ports A, B. Specifically, as shown in FIGS. 1 and 1A, one edge face (referred to as "incident edge face") 31a of the incidence-side optical waveguide 30a in the wavelength filtering device 3 becomes the side of the light source 5, and on the other side (referred to as "emission portion") 31b of the incidence-side optical waveguide 30a in the wavelength filtering device 3 is provided with a first wavelength dispersive device 9a for giving wavelength dispersion to light (hereinafter, frequently referred to as "straight light") Lc, which travels straight through the incidence-side optical waveguide 30a and outputted from the emission portion 31b (output port A) in this order. The first wavelength dispersive device 9a is formed on an extension line of the incidence-side optical waveguide 30a.

In the example of construction shown in FIG. 1, the light separated by using the microring resonator 32 (referred to as "separated light Ld") passes through the separation-side optical waveguide 30b, and an inversion path 30c for inverting the direction of the separated light Ld (resonance light Lb) and a second wavelength dispersive device 9b for giving wavelength dispersion to the separated light Ld inverted by the inversion path 30c are provided.

Another example of the construction can be employed in which, as shown in FIG. 1A, the inversion path 30c is not provided and an emission portion 31c is positioned on the other side of the separation-side optical waveguide 30b in the wavelength filtering device 3 (on the same side as the side of the incident edge face 31a), and a second wavelength dispersive device 9b (not shown) for giving wavelength dispersion to the separated light Ld separated by using the microring resonator 32 is formed on an extension line of the separation-side optical waveguide 30b. In FIG. 1A, the wavelength filtering device 3 is mainly shown, and hence the second wavelength dispersive device 9b and first wavelength dispersive device 9a are not shown in the figure.

Detailed descriptions are made later, but, for example, among the incident light L including non-resonance light La and resonance light Lb incident on the incidence-side optical waveguide 30a, the separated light Ld (=resonance light Lb) separated by a wavelength filter by a combination of the microring resonator 32 and the incidence-side optical waveguide 30a travels through the optical waveguide 33. The non-resonance light La which is not separated becomes straight light Lc which travels straight through the incidence-side optical waveguide 30a.

The separated light Ld (=resonance light Lb) which travels through the optical waveguide 33 is coupled with the separation-side optical waveguide 30b by a wavelength filter by a combination of the microring resonator 32 and the separation-side optical waveguide 30b. The separated light Ld (=resonance light Lb) coupled with the separation-side optical waveguide 30b travels through the separation-side optical waveguide 30b.

With respect to the light source 5, for example, a general pulsed laser light source, more specifically, a light source called femto second laser may be used. The femto second laser source is a light source which generates incoherent pulse light.

With respect to the optical system 7, simply a condenser 7a is shown in FIG. 1, but other optical members may be used actually. The optical system 7 condenses light (referred to as "incident light") L, which is generated by the light source 5, using the condenser 7a, or the like and permits it to enter the incident edge face 31a on the sidewall of the wavelength filtering device 3.

As shown in FIG. 1B, the resonance coupling of the incidence-side optical waveguide 30a and separation-side optical waveguide 30b having no wavelength selectivity in the wavelength filtering device 3 of the high-frequency signal generating apparatus 1 according to the first embodiment and the optical waveguide 33 constituting the microring resonator 32 has a feature that each optical waveguides 30a, 30b and the optical waveguide 33 constituting the microring resonator 32 are stacked in the thickness direction of a substrate by a SIMOX method. The microring resonator 32 having such a structure formed by a SIMOX method is particularly referred to as "vertical coupling microring resonator". By using a vertical coupling microring resonator, the power coupling ratio can be stably improved. (Detailed descriptions are made below in connection with the third embodiment).

The incidence-side optical waveguide 30a and separation-side optical waveguide 30b of the wavelength filtering device 3 in the first embodiment have a structure in which an insulating layer of silicon oxide ($SiO_2$) is formed on a silicon substrate 4 by using a SOI technique and a thin film of single crystal silicon a ridge (SOI waveguide) having desired width and thickness (height) is formed to portions corresponding to the optical waveguides 30a, 30b.

This is merely an example, and there can be employed, for example, a structure of strip wire (SOI waveguide) in which an insulating layer of silicon oxide ($SiO_2$) is formed on a silicon substrate 4 and a thin film having desired width and thickness (height) is formed in individual portions corresponding to the optical waveguides 30a, 30b in the insulating layer (see FIG. 1C-C).

With respect to the wavelength dispersive device 9, a general optical fiber having a coaxial structure including a medium having a refractive index n1 surrounded by a medium having a refractive index n2 (n1>n2) can be used in principle, but, when using such an optical fiber, for generating a several tens fs (femto seconds) or less high-frequency pulse signal, the optical fiber having a length as large as, e.g., several km is required, thus making it difficult to form a small-size system. Therefore, in the present embodiment, a general optical fiber of a coaxial structure is not used, but the structure in which, as shown in FIG. 1C, an insulating layer of silicon oxide ($SiO_2$) is formed on a silicon substrate 4 by using a SOI technique and a thin film of silicon Si having desired width and thickness (height) is formed in a portion corresponding to an optical waveguide 9a on (or in) the insulating layer may be employed.

The first example shown in FIG. 1C-A has a structure in which an optical waveguide 9a formed of single crystal silicon Si is formed simply on an insulating layer of silicon oxide ($SiO_2$) (referred to as "On SOI structure") In contrast, the second example shown in FIG. 1C-B has a structure in which, upon forming a thin film layer of single crystal silicon Si on an insulating layer of silicon oxide ($SiO_2$), a ridge (SOI waveguide) having desired width and thickness (height) is formed in a portion corresponding to an optical waveguide 9a. The third example shown in FIG. 1C-C has a strip wire (SOI waveguide) structure in which an optical waveguide 9a of single crystal silicon Si is formed in an insulating layer of silicon oxide ($SiO_2$). In any structures, a very fine pattern can be formed by use of a current VLSI (large scale integrated circuit) fabrication technique.

Method for Separating Wavelengths

Figure 2:
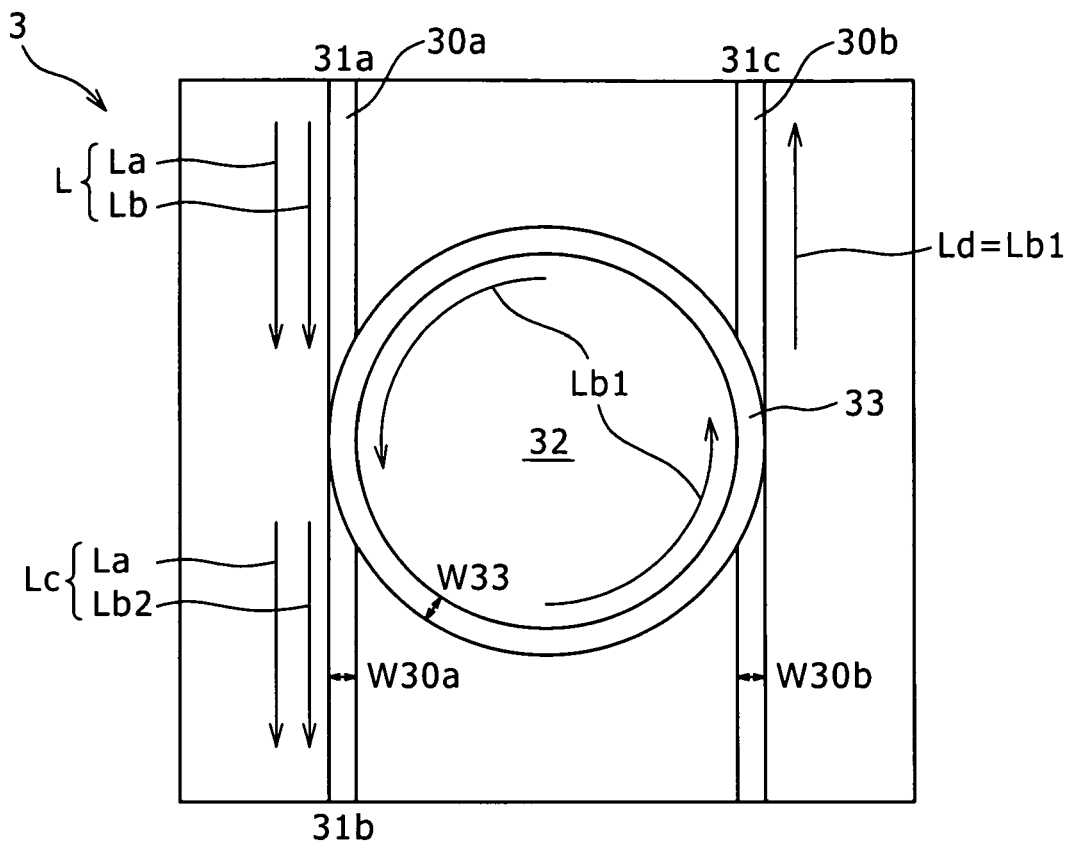
FIG. 2 is a view for explaining the propagation state of non-resonance light and resonance light in the scheme of wavelengths separation by the optical waveguide and microring resonator.
Figure 2A:
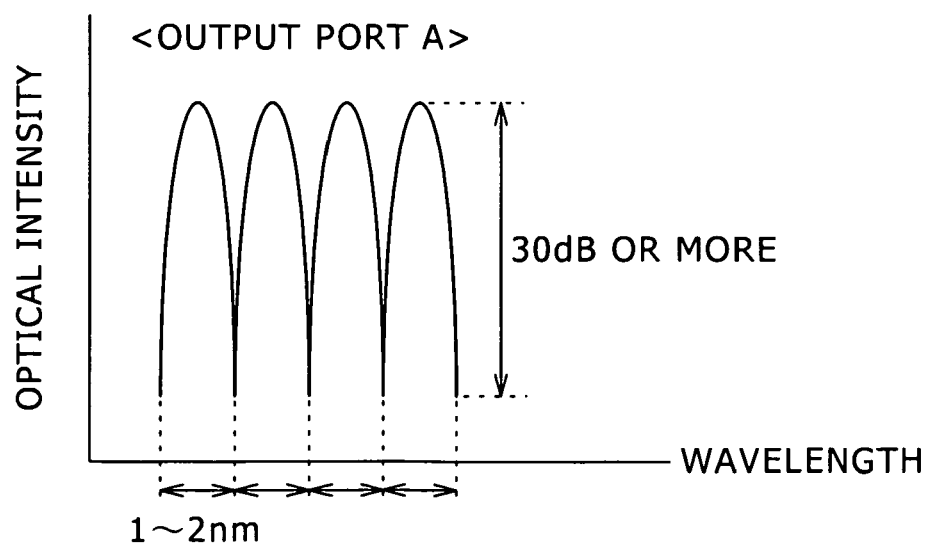
FIG. 2A is a wavelength spectrum view for explaining output characteristics at an emission portion (output port A) of the wavelength filtering device.
Figure 2B:
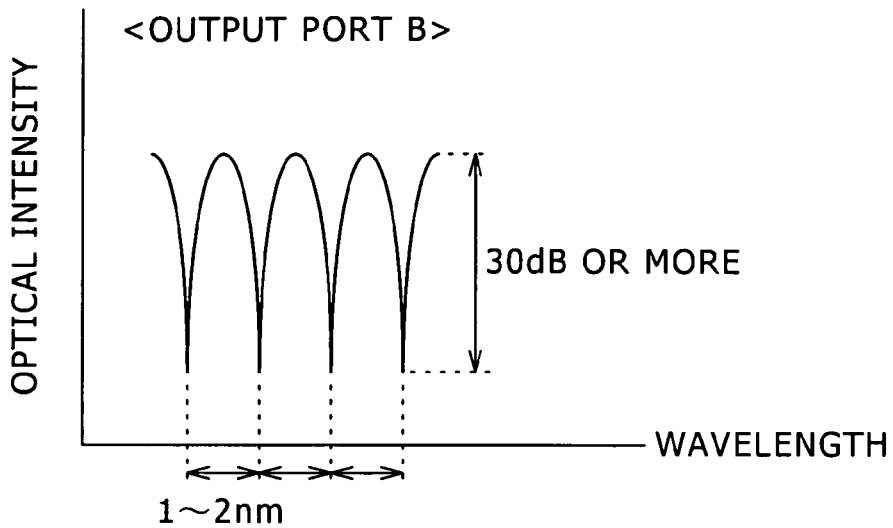
FIG. 2B is a wavelength spectrum view for explaining output characteristics at an emission portion (output port B) of the wavelength filtering device.

FIGS. 2, 2A, and 2B are views for explaining the scheme of separating wavelengths by the optical waveguide 30 and microring resonator 32. FIG. 2 is a view for explaining the propagation state of non-resonance light La and resonance light Lb. FIG. 2A is a wavelength spectrum view for explaining output characteristics at an emission portion 31b (output port A) of the wavelength filtering device 3. FIG. 2B is a wavelength spectrum view for explaining output characteristics at an emission portion 31c (output port B) of the wavelength filtering device 3.

Incident light L having a wavelength width of, e.g., several tens nm is generated from the light source 5 and caused to enter the incident edge face 31a of the wavelength filtering device 3. In this case, as shown in FIG. 2, a combination of the microring resonator 32 (optical waveguide 33) and the incidence-side optical waveguide 30a or separation-side optical waveguide 30b having no wavelength selectivity functions as a wavelength filter, so that the light having a wavelength equal to that of the resonance frequency of the microring resonator 32 (resonance light Lb) guides the optical waveguide 33 of the microring resonator 32 at a very large power coupling ratio (the separated light Ld which is a component separated and introduced into the optical waveguide is referred to as "resonance light Lb1").

Therefore, almost all the resonance light Lb (resonance light Lb1) is separated toward the separation-side optical waveguide 30b, and the component (resonance light Lb2), which constitutes straight light Lc like the light (non-resonance light La) having a wavelength which is not equal to the resonance frequency of the microring resonator 32, is considerably reduced. That is, large part of the light having a wavelength equal to the resonance frequency of the microring resonator 32 (resonance light Lb) is outputted from the output port B.

Accordingly, the optical intensity of the output light (with respect to the non-resonance light La and resonance light Lb2) at the output port A varies greatly as shown in FIG. 2A. Further, the optical intensity of the output light (with respect to the resonance light Lb1) at the output port B varies greatly as shown in FIG. 2B.

Experiments have confirmed that, when incident light L (laser light) having a wavelength width of, e.g., several tens nm enters the wavelength filtering device 3 as shown in FIG. 1A, namely, enters the vertical coupling wavelength filtering device using a SIMOX optical waveguide device, modulating light having a modulation width of 30 dB or more is outputted as shown in FIGS. 2A and 2B. In this case, by using the microring resonator 32 having a size ($\phi$32) of about 100 to 200 μm, modulation of about 30 dB at intervals of 1 to 2 nm can be made.

Process for Generating a High-Frequency Signal: Basic

Figure 3:
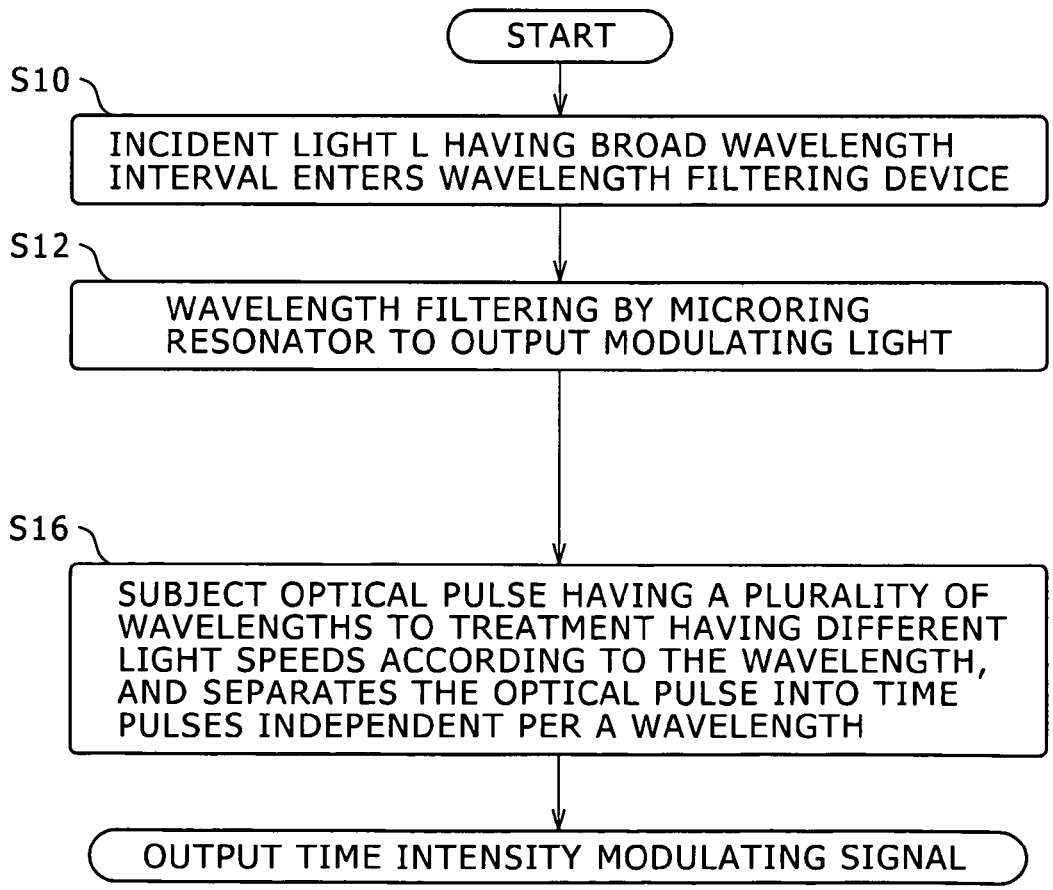
FIG. 3 is a flowchart for explaining a basic process for generating a high-frequency pulse signal by means of the apparatus for generating a high-frequency signal.

FIG. 3 is a flowchart for explaining a basic process for generating a high-frequency pulse signal by means of the high-frequency signal generating apparatus 1.

A basic view is that incident light L (laser) having a wide wavelength is caused to enter a wavelength filtering device having a high modulation factor and a wavelength dispersive device from the light source 5 through the optical system 7, thereby generating a pulse signal having intensity fast modulated in respect of time. The first example of the process for generating a modulating signal has a feature that a single pulse is generated.

Incident light L having a wide wavelength is first generated by the light source 5 utilizing a general pulsed laser source, and the incident light L is caused to enter the incident edge face 31a of the incidence-side optical waveguide 30a having no wavelength selectivity in the wavelength filtering device 3 (S10) through the optical system 7. The incident light L includes at least resonance light Lb having a wavelength equal to the resonance frequency of the microring resonator 32.

In the wavelength filtering device 3 to which the incident light L including resonance light Lb enters, a combination of the microring resonator 32 and the incidence-side optical waveguide 30a or separation-side optical waveguide 30b constitutes a wavelength filter functions, whereby the resonance light Lb component is subject to wavelength separation (wavelength filtering), and as shown in FIGS. 2A and 2B, modulating light having periodic wavelength intervals and a relatively large modulation factor (e.g., 30 dB or more) is outputted from the output ports A, B (S12).

The wavelength dispersive device 9 inputted with an optical pulse having a plurality of wavelengths develops the optical pulse in respect of time, namely, subjects the optical pulse to treatment having different light speeds according to the wavelength, thereby separating the optical pulse into time pulses independent with respect to the wavelength (S16) As a result, the wavelength dispersive device 9 outputs an optical pulse train having a frequency higher than that of the incident light L and having intensity modulated in the time axis direction, i.e., and a modulating signal having intensity which changes in respect of time (referred to as "time intensity modulating signal").

By using the wavelength filtering device 3 having a high modulation factor and the wavelength dispersive device 9, an optical signal having intensity modulated at high speed in respect of time may be generated based on the incident light L having a wide wavelength. By use of the wavelength filtering device 3 and wavelength dispersive device 9 which are passive optical members, frequencies of an optical pulse having a wide wavelength generated by using an existing electrical method, such as atypical pulse laser source, may be increased in several to several tens times without extra electric load.

Process for Generating a High-Frequency Signal: First Example

FIGS. 4A to 4F are diagrams for explaining the first example of a process for generating a high-frequency pulse signal by means of the high-frequency signal generating apparatus 1. FIGS. 4A to 4F show waveform characteristics (time rate or wavelength rate) in the individual steps for optical signal conversion with respect to the optical pulse.

Figure 4A:
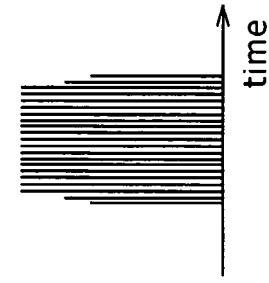

Specifically, as shown in FIG. 4A, a pulsed laser light having a wavelength width of several tens nm as an input signal is first caused to enter the incident edge face 31a of the wavelength filtering device 3. Accordingly, as expected from FIGS. 2A and 2B, modulating light having a wavelength spectrum shown in FIG. 4B is outputted from the output ports A, B. As explained above with reference to FIGS. 2A and 2B, by setting a size of the microring resonator 32 as around 100 to 200 μm, the incident light L having a wavelength width of several tens nm (optical pulse having a wide wavelength) is subjected to wavelength separation, achieving modulation of about 30 dB at intervals of 1 to 2 nm.

Figure 4C:
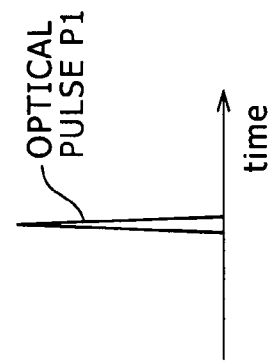
Figure 4E:
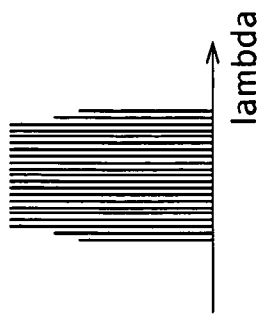
Figure 4B:
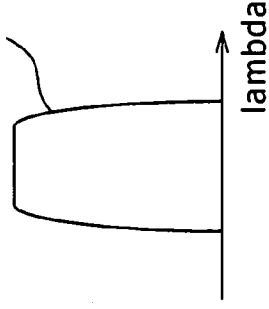

The wavelength filtering device 3 has no wavelength dispersive function, and therefore, as shown in FIG. 4C (indicated by time rate), the time change of the pulse laser light source is maintained to form an optical pulse P1 having a time width of about several tens fs.

Then, the optical pulse outputted from the wavelength filtering device is caused to enter the wavelength dispersive device 9 having large wavelength dispersion. In the wavelength dispersive device 9, an optical pulse having a plurality of wavelengths is subjected to wavelength dispersion, namely, treatment of different light speeds according to the wavelength, thereby separating the optical pulse into time pulses independent with respect to the wavelength. As a result, the optical pulse having a time change shown in FIG. 4C is separated into time pulses independent with respect to the wavelength shown in FIG. 4E (referred to also as "optical pulse train").

Figure 4F:
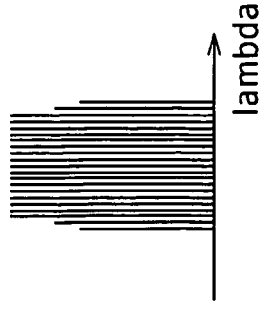

Each of the time pulses is also an optical pulse, and it is considered that the optical pulse is a collection of a plurality of wavelength components, and hence a wavelength spectrum shown in FIG. 4F is obtained. In this case, the wavelength data is not changed by the wavelength dispersive device 9, and therefore the wavelength spectrum of output shown in FIG. 4F is the same as the wavelength spectrum shown in FIG. 4B.

As is apparent from the above, in the first example of the process for generating a high-frequency signal, by performing optical signal conversion with respect to the relatively broad band optical pulse having a plurality of wavelength components (FIG. 4A) by application of the wavelength filtering device 3 and wavelength dispersive device 9 which are passive devices, a higher-frequency optical pulse train (FIG. 4E) may be generated.

Process for Generating a High-Frequency Signal: Second Example

FIGS. 5A to 5D are diagrams for explaining the second example of a process for generating a high-frequency pulse signal by means of the high-frequency signal generating apparatus 1. FIGS. 5A to 5D show waveform characteristics (time rate or wavelength rate) in the individual steps for optical signal conversion with respect to the optical pulse.

The second example of the process for generating a high-frequency signal has a feature in that a continuous pulse is generated. The basic process is same as the process shown in the flowchart of FIG. 3, but differ in that a continuous pulse having a period at regular intervals is inputted.

For example, a plurality of pulse lasers light having a wavelength of several tens nm width as shown in FIG. 5A (indicated by time rate) as an input signal are first caused to enter the incident edge face 31a of the wavelength filtering device 3 in the same manner as with a case in the first example. As a result, modulating light having a wavelength spectrum shown in FIG. 5B for modulation of about 30 dB at intervals of 1 to 2 nm is outputted from the output ports A, B.

With respect to the characteristics of the wavelength dispersive device 9, by subjecting the wavelengths contained in the optical pulse to dispersion so that spaces between optical pulses P1, P2, P3 are evenly filled, the output from the wavelength dispersive device 9 is transformed into time pulses having the same cycle as shown in FIG. 5C. When wavelength dispersion is made by the wavelength dispersive device 9, evenly filling the spaces between the optical pulses P1, P2, P3 with high-frequency pulses may be easily controlled by changing the length.

The time pulses having the same period are individually an optical pulse, and it is considered that the optical pulse is a collection of a plurality of wavelength components, and hence a wavelength spectrum shown in FIG. 5D is obtained. In this case, the wavelength data is not changed by the wavelength dispersive device 9, and therefore the wavelength spectrum of output shown in FIG. 5D is the same as the wavelength spectrum shown in FIG. 5B.

As is apparent from the above, in the second example of the process for generating a high-frequency signal, by performing optical signal conversion with respect to the relatively broad band optical pulse having a plurality of wavelength components (FIG. 4A) with use of the wavelength filtering device 3 and wavelength dispersive device 9 which are passive devices, a continuous, higher-frequency optical pulse train (FIG. 5C) may be generated.

Second Embodiment

Figure 6:
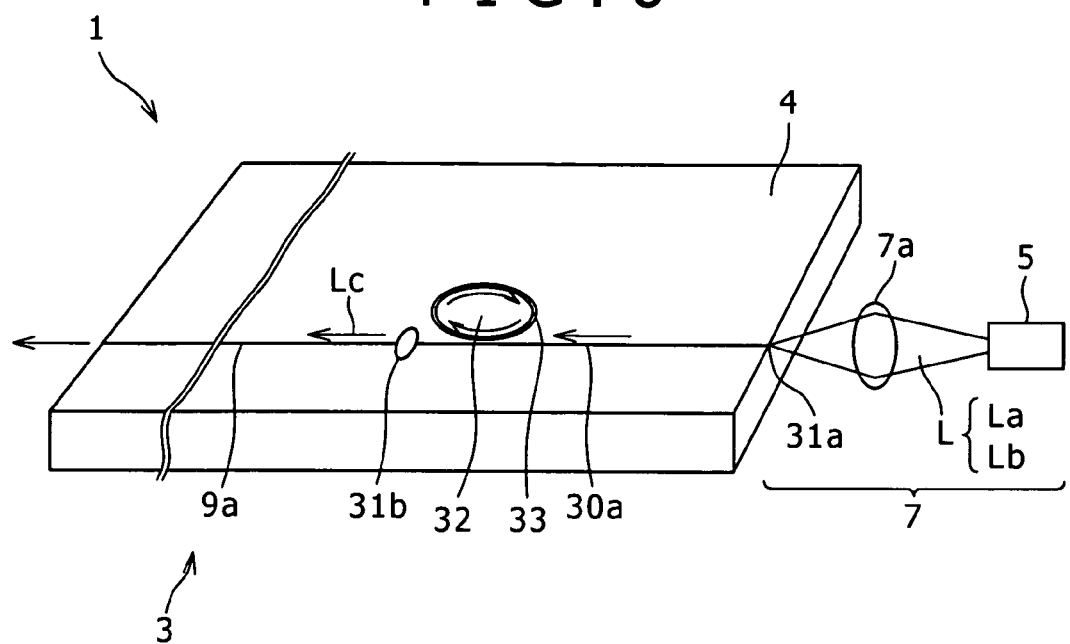
FIG. 6 is a perspective view showing the whole structure of an apparatus for generating a high-frequency signal according to the second embodiment of the present invention.
Figure 6A:
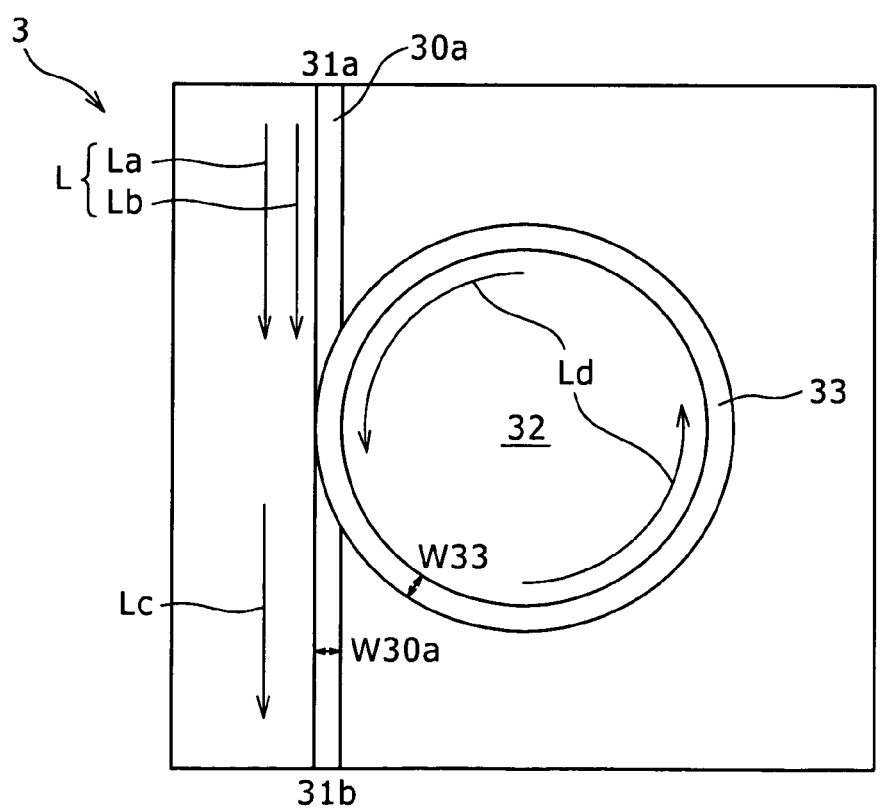
FIG. 6A is a plan view of a wavelength filtering device in the apparatus for generating a high-frequency signal according to the second embodiment.

FIGS. 6 and 6A are views for explaining an apparatus for generating a high-frequency signal according to the second embodiment of the present invention. FIG. 6 is a perspective view showing the whole structure of an apparatus for generating a high-frequency signal 1 (hereinafter, referred to as "high-frequency signal generating apparatus 1") according to the second embodiment. FIG. 6A is a plan view of a wavelength filtering device 3 in the high-frequency signal generating apparatus 1 according to the second embodiment.

Unlike the high-frequency signal generating apparatus 1 according to the first embodiment, the high-frequency signal generating apparatus 1 according to the second embodiment has a structure in which the separation-side optical waveguide 30b of the wavelength filtering device 3 is removed and a modulating signal is obtained only from the output port A.

The separation-side optical waveguide 30b is not formed in the wavelength filtering device 3, and therefore the second wavelength dispersive device 9b is not formed in the high-frequency signal generating apparatus 1 according to the second embodiment.

The high-frequency signal generating apparatus 1 according to the second embodiment has a structure in which a modulating signal is obtained only from the output port A, and hence all the constituent optical waveguides may be linearly arranged, thereby obtaining effects of the simplified layout.

Third Embodiment

Figure 7:
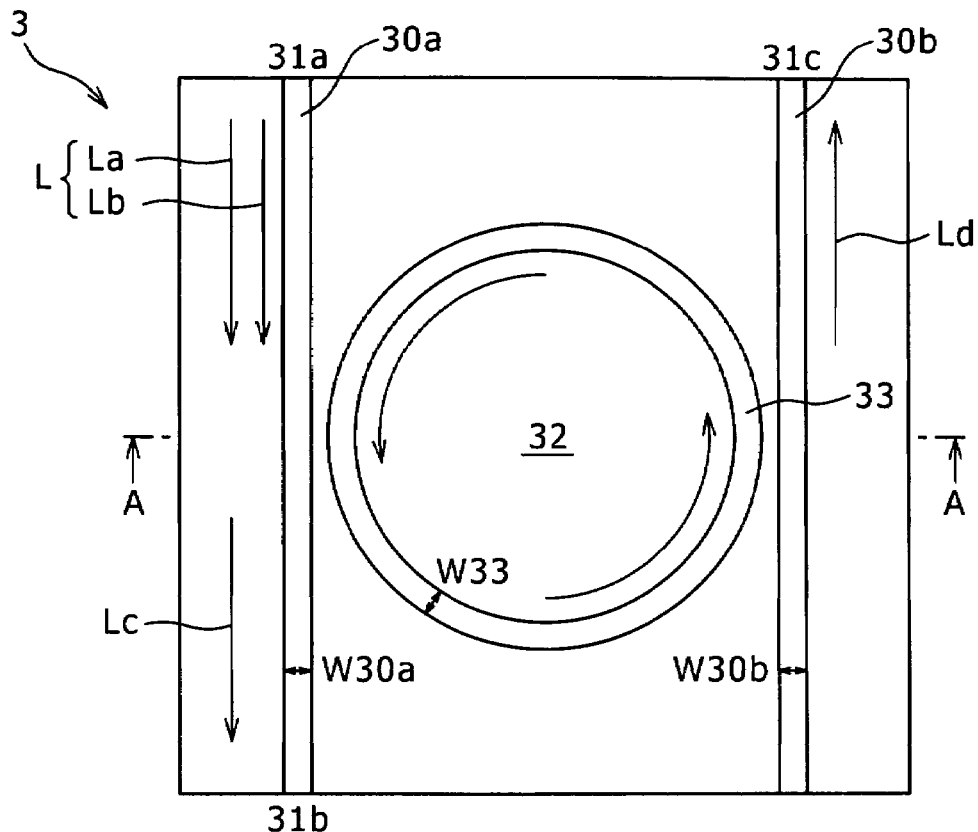
FIG. 7 is a perspective view showing a whole configuration of an apparatus for generating a high-frequency signal according to the third embodiment of the present invention.
Figure 7A:
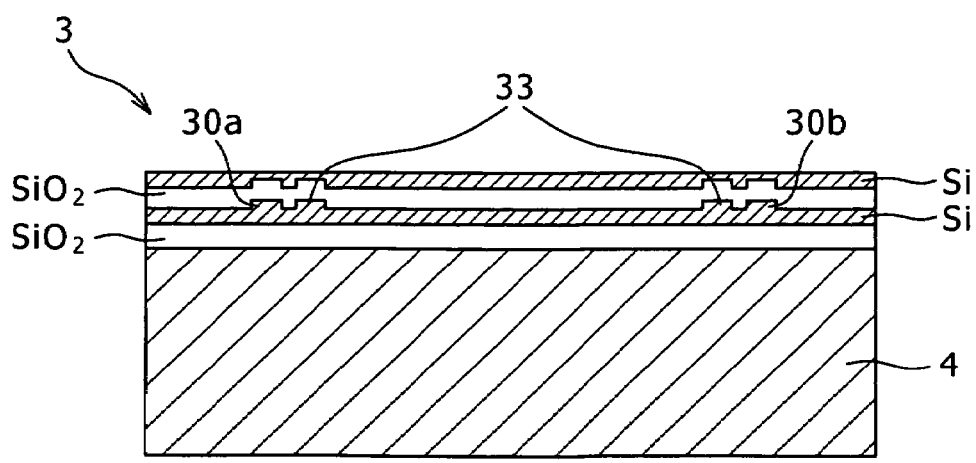
FIG. 7A is a plan view of the wavelength filtering device of an apparatus for generating a high-frequency signal according to the third embodiment.

FIGS. 7 and 7A are views for explaining an apparatus for generating a high-frequency signal according to the third embodiment of the present invention. FIG. 7 is a plan view of a wavelength filtering device 3 in an apparatus for generating a high-frequency signal 1 (hereinafter, referred to as "high-frequency signal generating apparatus 1") according to the third embodiment. FIG. 7A is a cross-sectional view of the wavelength filtering device 3 of FIG. 7 (taken along the line A-A' of FIG. 7). FIG. 7B are views and a graph for explaining the difference between the wavelength filtering devices 3 in the high-frequency signal generating apparatuses 1 according to the first and third embodiments.

As shown in FIGS. 7 and 7A, the resonance coupling of the incidence-side optical waveguide 30a and separation-side optical waveguide 30b having no wavelength selectivity in the high-frequency signal generating apparatus 1 according to the third embodiment (wavelength filtering device 3) and the optical waveguide 33 constituting the microring resonator 32 has a feature in that the optical waveguides 30a, 30b and the optical waveguide 33 constituting the microring resonator 32 are disposed in the plane direction on a substrate in parallel. The microring resonator 32 having such structure is particularly referred to as "lateral coupling microring resonator".

The use of a lateral coupling microring resonator has an advantage in that the microring resonator 32 may be formed by a simple etching step using a lithography exposure technique without use of SIMOX. On the other hand, as shown in FIG. 7B, the power coupling ratio is lowered, as compared to that of a vertical coupling microring resonator.

Specifically, as can be understood from the characteristic diagram for power coupling ratio shown in FIG. 7B, the power coupling ratio greatly affected by the gap. When the gap in the resonance coupling portion is about 0.1 µm, the power coupling ratio is 0.4 or more, but, when the gap becomes about 0.15 µm or more, the power coupling ratio becomes extremely small. In that meaning, it is necessary to control the gap to become about 0.1 µm or less.

The vertical coupling microring resonator may be formed by a SIMOX technique which is a SOI forming technique using oxygen ion implantation. Therefore, a gap between the ring optical waveguide 33 and the linear optical waveguide 30 (incidence-side optical waveguide 30a or separation-side optical waveguide 30b) can be formed uniformly irrespective of the exposure accuracy, as compared to a lateral coupling microring resonator produced by use of a lithography exposure technique, and hence the gap can be controlled to be about 0.1 µm or less. Therefore it is suitable for stably improving the power coupling ratio.

According to one embodiment of the present invention, an optical pulse having a wide wavelength is caused to enter a wavelength filtering device having a predetermined modulation degree, and the output optical pulse is caused to enter a wavelength dispersive device, whereby a high-frequency pulse train is generated. The wavelength filtering device and wavelength dispersive device are passive parts, and therefore a high-frequency optical pulse train can be obtained without electric load.

If the first and second optical waveguides in the wavelength filtering device are formed by a SOI technology, an integrated circuit fabrication technique can be used, and hence a very fine pattern can be formed. Further, the material for substrate is not glass but silicon, and therefore a disadvantage of poor mass-productivity like the glass substrate may be avoided.

Further, by using a SIMOX technique, a gap between the first optical waveguide and the second optical waveguide can be formed uniformly irrespective of the lithographic exposure accuracy, thereby enabling stable improve of the power coupling ratio.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-188964 filed in the Japanese Patent Office on Jul. 20, 2007, the entire content of which being incorporated herein by reference.

What is claimed is:

1. A method for generating a high-frequency signal, comprising the steps of:
   entering an optical pulse to a wavelength filtering device and generating modulating light having periodic wavelength intervals; and
   inputting the optical pulse outputted from the wavelength filtering device to a wavelength dispersive device to subject the optical pulse to treatment of different speeds according to the wavelength, and separating the optical pulse into time pulses independent with respect to the wavelength,
   wherein the wavelength filtering device includes a first optical waveguide having no wavelength selectivity through which the optical pulse generated by the light source travels straight, and a microring resonator having a second optical waveguide as a principal portion disposed at a position for resonance coupling with the first optical waveguide.

2. An apparatus for generating a high-frequency signal, comprising:
   a light source for generating an optical pulse;
   a wavelength filtering device for generating modulating light having periodic wavelength intervals based on the optical pulse generated by the light source; and
   a wavelength dispersive device for subjecting a plurality of wavelength components contained in the optical pulse outputted from the wavelength filtering device to treatment of different speeds according to the wavelength, and separating the optical pulse into time pulses independent with respect to the wavelength,
   wherein the wavelength filtering device includes a first optical waveguide having no wavelength selectivity through which the optical pulse generated by the light source travels straight, and a microring resonator having a second optical waveguide as a principal portion disposed at a position for resonance coupling with the first optical waveguide.

3. The apparatus for generating a high-frequency signal according to claim 2, wherein;
   each of the first and second optical waveguides in the wavelength filtering device is formed by a SOI (silicon on insulator) technology.

4. The apparatus for generating a high-frequency signal according to claim 3, wherein;
   each of the first and second optical waveguides in the wavelength filtering device is formed by a SIMOX technology and silicon and silicon oxide are stacked in the thickness direction of a substrate.

5. The method for generating a high-frequency signal according to claim 1, further comprising:
   laminating a microring resonator and an optical waveguide having no wavelength selectivity in the thickness direction.

* * * * *